United States Patent [19]

Fecik et al.

[11] Patent Number: 5,320,661
[45] Date of Patent: Jun. 14, 1994

[54] METHOD AND APPARATUS OF BENDING GLASS SHEETS

[75] Inventors: Michael T. Fecik, Pittsburgh; Robert G. Frank, Sarver, both of Pa.

[73] Assignee: PPG Industries, Inc., Pittsburgh, Pa.

[21] Appl. No.: 908,149

[22] Filed: Jul. 2, 1992

[51] Int. Cl.$^5$ .......................................... C03B 23/023
[52] U.S. Cl. .................................... 65/104; 65/106; 65/107; 65/268; 65/273
[58] Field of Search ............... 65/104, 106, 107, 268, 65/273, 287

[56] References Cited

U.S. PATENT DOCUMENTS

| | | | |
|---|---|---|---|
| 4,204,854 | 5/1980 | McMaster et al. | 65/106 |
| 4,233,049 | 11/1980 | Seymour | 65/106 |
| 4,272,274 | 6/1981 | Frank et al. | 65/273 |
| 4,285,715 | 8/1981 | Frank | 65/106 |
| 4,662,925 | 5/1987 | Thimons et al. | 65/104 |
| 4,746,348 | 5/1988 | Frank | 65/104 |
| 4,767,434 | 8/1988 | Schwartz et al. | 65/29 |
| 4,830,650 | 5/1989 | Kelly | 65/106 |
| 4,936,890 | 6/1990 | Colmon et al. | 65/273 |
| 4,990,170 | 2/1991 | Vanaschen et al. | 65/104 |
| 5,004,491 | 4/1991 | McMaster et al. | 65/106 |
| 5,160,524 | 11/1992 | Pernelle et al. | 65/268 |

Primary Examiner—Joye L. Woodard
Attorney, Agent, or Firm—Andrew C. Siminerio

[57] ABSTRACT

A traveling vacuum pickup engages heat softened glass sheets in a transfer station and transfers them to one of two shaping stations positioned along opposing sides of a transfer station. After depositing the sheet within one of the shaping stations, the pickup return to the transfer station to receive the next heat softened sheet. The shaping stations may include pressing arrangements that shape successive sheets to different configurations. The vacuum pickup may include two sheet engaging surfaces positioned relative to each other such that as one engaging surface engages a glass sheet and transfers it to one of the shaping stations, the other engaging surface is being positioned within the transfer station to receive the next glass sheet.

21 Claims, 3 Drawing Sheets

METHOD AND APPARATUS OF BENDING GLASS SHEETS

BACKGROUND OF THE INVENTION

This invention relates to bending of glass sheets and in a particular to a glass sheet shaping system which utilizes a vacuum pickup arrangement to move heat softened glass sheets to two independent shaping stations.

Shaped glass sheets are widely used as windshields, side windows or rear windows in vehicles such as automobiles and the like. To be suitable for such applications, flat glass sheets must be shaped to precisely define curvatures dictated by the shape and outline of the frames defining the window openings into which the glass windows are installed. It is also important that the windows meet stringent optical requirements and that they be free of optical defects that would tend to interfere with the clear viewing therethrough in their viewing area.

During fabrication, the glass sheets may be subjected to thermal treatment to control internal stresses. In particular, glass sheets used for windshields are normally annealed to reduce the internal stresses while glass sheets used for side windows or rear windows are tempered to induce compressive stresses in the major surfaces of the sheets and tensile stresses in the center regions. Tempering strengthens the glass and increases its resistance to damage resulting from impact.

In the heating and shaping of glass sheets for windshields, it is common practice to use contoured bending molds that support one or more flat glass sheets and convey it through a heating lehr. As the temperature of the glass increases and approaches its heat softening temperature, it begins to sag under the force of gravity and conforms to the contours of the shaping rails on the mold.

During the commercial production of tempered glass sheets for sidelights and backlights, a glass sheet is generally conveyed along a substantially horizontal path through a tunnel type furnace, heated to its heat softening temperature and transferred into a shaping station adjacent the furnace where the glass sheet is shaped. After shaping, the shaped glass sheet is transferred to a cooling station where it is controllably cooled. The heat softened glass sheet may be shaped, for example, by pressing the sheet between a pair of upper and lower shaping surfaces such as that disclosed in U.S. Pat. Nos. 4,272,274, 4,662,925 and 4,830,650.

It would be beneficial to have a glass sheet shaping arrangement that provides for high speed shaping of glass sheets while maintaining high optical quality and shape control and in addition allows for the shaping of successive glass sheets to different configurations.

SUMMARY OF THE INVENTION

The present invention provides an apparatus for shaping heat softened glass sheets and includes a transfer station, first and second shaping stations positioned along opposing sides of the transfer station and a vacuum pickup having a sheet engaging surface. Each of the shaping stations include a sheet shaping arrangement and the vacuum pickup is movable between the shaping stations and within the transfer station. The vacuum pickup holds a glass sheet against its engaging surface by vacuum drawn along the surface. Means are provided to lift the heat softened glass sheets into engagement with sheet engaging surface when it is within the transfer station, to deposit the heat softened glass sheet from the sheet engaging surface onto one of the shaping means within one of the shaping stations where it is shaped to a desired configuration, to remove the shaped glass sheet from the one shaping station and to controllably cool the shaped sheet.

The present invention also provides a method of shaping glass sheets. Glass sheets are heated and conveyed into a transfer station. A vacuum pickup having a sheet engaging surface is initially positioned such that the sheet engaging surface is within the transfer station. A first sheet is conveyed into the transfer station and lifted into engagement with the engaging surface of the vacuum pickup. Vacuum is drawn along the sheet engaging surface to secure the first glass sheet against the pickup. The pickup is then moved such that the sheet engaging surface and the first glass sheet move from the transfer station to the first shaping station. Vacuum is terminated along the sheet engaging surface to deposit the first glass sheet on a first shaping means at the first shaping station. The pickup is then moved back into the transfer station and the sheet is shaped and controllably cooled. A second glass sheet is then conveyed into the transfer station, lifted into engagement with the sheet engaging surface of the vacuum pickup and secured thereagainst by vacuum. The pickup is then moved such that the sheet engaging surface and the second sheet move from the transfer station to the second shaping station. Vacuum is terminated along the second sheet engaging surface to deposit the second glass sheet on a second shaping means at the second shaping station. The pickup is then moved back to the transfer station and the second glass sheet is shaped and controllably cooled.

DETAILED DESCRIPTION OF THE INVENTION

Figure 1:
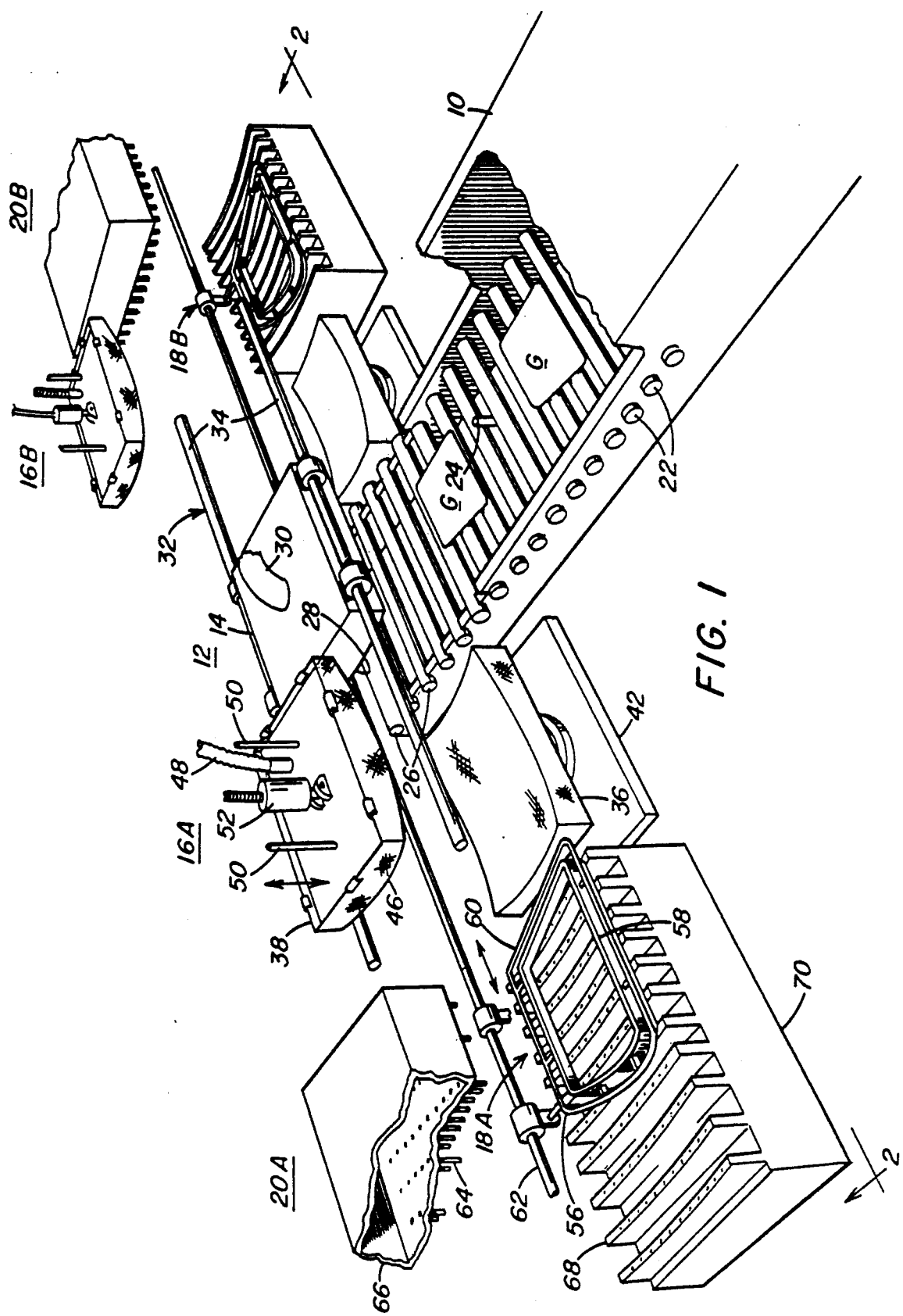
FIG. 1 is a perspective view of a preferred embodiment of the invention, with portions removed for clarity.

Referring to FIG. 1, an apparatus for shaping and treating heat softenable materials, such as glass but also including plastic and other sheet materials, includes a tunnel type furnace 10 through which a series of glass sheets G is conveyed from a loading station (not shown) at the upstream end of the furnace 10, along a generally horizontal path to a transfer station 12 where a glass sheet G is engaged by vacuum pickup 14. The pickup 14 lifts and holds the glass sheet G by vacuum, as will be discussed later in more detail, and travels it to a position within one of two shaping stations 16A and 16B positioned along opposing sides of the transfer station 12. The heat softened sheet G is shaped at shaping station 16A or 16B and transferred by sheet transfer means 18A or 18B to a corresponding cooling station 20A or 20B where it is controllably cooled. If desired, the transfer station 12 and shaping stations 16A and 16B may be enclosed within a heated cavity (not shown) to reduce heat loss during the transfer and forming operation, as will be discussed later in more detail.

Heat may be supplied to the furnace 10 in any convenient manner, for example, from gas heaters or by electrical radiant heaters or a combination of both, which heat supply means is well known in the art. The furnace 10 includes a horizontal conveyor comprising longitudinally spaced transversely extending conveyor rolls 22 of a type well known in the art that define a path of travel which extends through the furnace 10. The conveyor rolls 22 may be arranged in sections so that the speed of the different conveyor sections may be controlled and synchronized in a manner well known in the art, for proper positioning and movement of the glass sheets through the furnace 10. A glass sensing element 24 is located within the furnace 10, as shown in FIG. 1, to initiate a cycle of operation for bending as will be discussed later.

The transfer station 12 includes a series of spaced support rolls 26 arranged to support each heat softened glass sheet G in turn as they exit the furnace 10 and enter the transfer station 12. The transfer station 12 further includes the vacuum pickup 14 with glass sheet engaging surface 28. Although not limiting in the present invention, is one particular embodiment of the invention, surface 28 is flat. In the embodiment shown in FIG. 1, the vacuum pickup 14 has an evacuation pipe 30 connected through a suitable valve arrangement (not shown) to a vacuum source (not shown). Drawing and releasing vacuum along surface 28 of the vacuum pickup 14 is synchronized to a predetermined cycle as will be discussed later in more detail.

A glass sheet G positioned on rolls 26 under the pickup 14 within transfer station 12 is lifted into engagement with surface 28 by drawing a vacuum along the surface. If desired, this lifting of the glass sheet may be assisted by providing mechanical lifters positioned between rolls 26 to physically engage and lift the glass sheet G as shown in FIG. 2A. As an alternative, gas jets (not shown) may be positioned below the rolls 26 within transfer station 12, for example as disclosed in U.S. Pat. No. 4,204,854, to direct gas streams upwardly against the lower major surface of the glass sheet G and lift it into engagement with the vacuum pickup 14.

Figure 2:
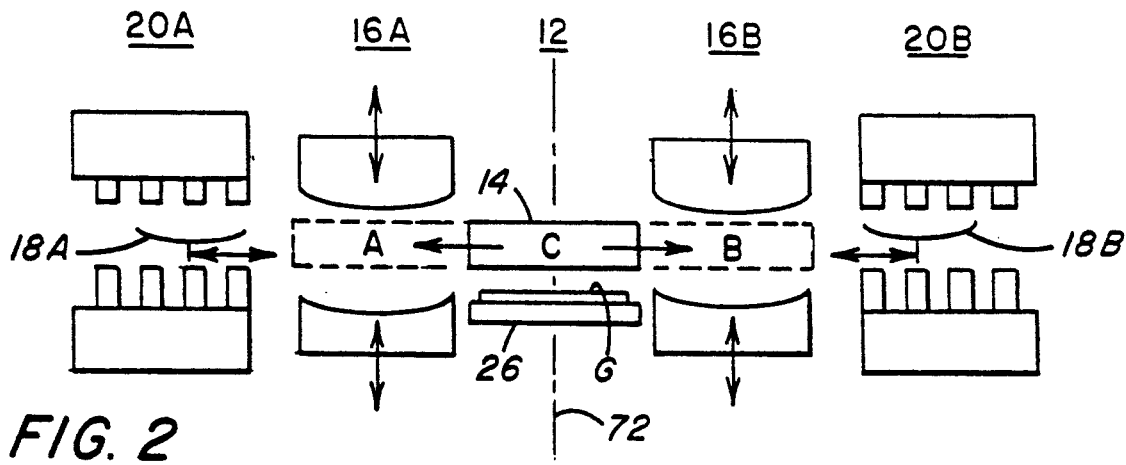
FIG. 2 is a schematic view of the invention taken along line 2—2 of FIG. 1.
Figure 2A:
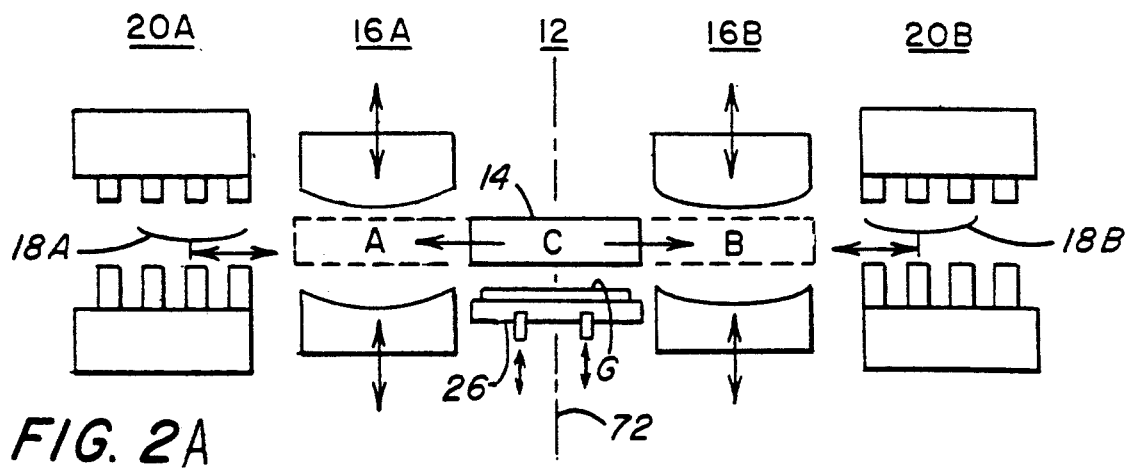
FIG. 2A is a schematic view similar to that shown in FIG. 2 further including mechanical lifters and glass sheet shaping molds having different shaping surface configurations, with portions removed for clarity.

As shown in FIGS. 1 and 2, the vacuum pickup 14 is horizontally movable via a shuttle arrangement 32 which may be similar to that disclosed in U.S. Pat. Nos. 4,662,925 and 4,767,434 or the like. A motor drive (not shown) moves the pickup 14 along guide rails 34 through transfer station 12 and between shaping stations 16A and 16B in a manner as will be discussed later in more detail.

Shaping station 16A is similar in construction to shaping station 16B, sheet transfer means 18A is similar in construction to sheet transfer means 18B and cooling station 20A is similar in construction to cooling station 20B. The following discussion will be directed toward station 16A, transfer means 18A and cooling station 20A with the understanding that corresponding shaping station 16B, sheet transfer means 18B and cooling station 20B most likely are, but not required to be, identical.

Referring to FIG. 1, shaping station 16A includes a full surface lower mold 36 and an upper mold 38, e.g. as disclosed in U.S. Pat. No. 4,662,925. In the particular embodiment shown in FIG. 1, the lower mold 36 is a full surface mold with an upper pressing surface 40 conforming to the shape desired for the glass sheet to be bent. The lower mold 36 is fixed to a lower mold platform 42 operatively connected to piston (not shown) for vertical reciprocating movement. It should be appreciated that the lower mold 36 may also be a ring type shaping mold which contacts and supports only the peripheral edge portion of the glass sheet to be shaped.

The upper mold 38 may be a vacuum mold with an upper mounting plate (not shown) and an apertured lower press face 46 which compliments upper pressing face 40 of the lower mold 36. The upper vacuum mold 38 includes a vacuum chamber (not shown) which communicates through an evacuation tube 48 with a vacuum source (not shown). Referring to FIG. 1, the upper mold 38 is vertically movable relative to the lower mold 36 along guides 50 by piston 52. The evacuation pipe 48 may be connected through a suitable valve arrangement to a vacuum source (not shown) and the valve for the vacuum line may be synchronized according to a predetermined time cycle in a manner well known in the art.

The surfaces 40 and 46 of the molds 36 and 38, respectively, are preferably smoothly surfaced to avoid imparting any irregularities in the glass surface and although not limiting in the present invention are preferably composed of steel, cast iron, brass or ceramic composite. These materials provide a smoothly surfaced contour and good durability despite intermittent contact with hot glass that causes rapid cyclic temperature variations over an extended period. Both the upper and lower molds 36 and 38 may be provided with a cover such as fiber glass cloth or stainless steel knitted mesh as is known in the art.

Referring to FIG. 1, sheet transfer means 18A is provided to move the shaped glass sheets G from the shaping station 16A into the cooling station 20A and includes a transfer ring 56, e.g. as disclosed in U.S. Pat. No. 4,285,715. The ring 56 includes a support rail 58 with a supporting surface that follows the contours of the shaped glass sheet spaced slightly inward of the shaped glass periphery. The glass sheet supporting surface of the rail 58 is preferably a non-metallic material that can support the hot glass sheet without leaving a mark on the glass sheet surface. The ring 56 is mounted on a carriage 60 which moves the ring 56 along guide rail 62 from an upstream position where the ring 56 is positioned in the shaping station 16A beneath the upper vacuum mold 38, to a downstream position where the ring 56 is positioned between air nozzles in the cooling station 20A.

The cooling station 20A includes longitudinally spaced, transversely extending rows of spaced nozzles 64 extending downward from an upper platen 66 and in an opposing position to longitudinally spaced, transversely extending rows of bar nozzles 68 on a lower platen 70, e.g. as discussed in U.S. Pat. No. 4,285,715. The bar nozzles 68 are spaced vertically below the upper nozzles 64 to provide clearance for moving the ring 56 along a path therethrough. The lower ends of the rows of the upper nozzles 64 are located along a curved surface complimenting the curved shape of the upper ends of bar nozzles 68 and vertically spaced thereabove to provide a curved clearance space conforming to the transfer shape of the glass sheet conveyed therebetween.

In operation, each glass sheet G in turn is conveyed through the furnace 10 and heated to its heat softening temperature while supported across it entire width on rolls 22. Sensor 24 senses the position of a leading glass sheet in the series, e.g. its leading or trailing edge and sends this information to a controller (not shown) which controls the conveying rates of rolls 22 in furnace 10 and rolls 26 to transfer station 12. While it is possible to preset any desired program of rotational speeds for conveyor rolls 22 and 26, in one particular embodiment, the program involves rotating conveyor rolls 22 within the furnace 10 at a rate of rotation sufficient to transport a series of glass sheets through the furnace 10 at a constant speed on the order of 400–450 inches (10.2–11.4 m) per minute. As each glass sheet G approaches the end of the furnace 10, the rolls 22 at the downstream end of the furnace 10 and rolls 26 accelerate in unison to increase the glass sheet's speed to a speed on the order of 1200 inches (30.5 m) per minute for transfer to the transfer station 12.

Referring to FIGS. 1 and 2, the vacuum pickup 14 is initially positioned within the transfer station 12 at Position G. When the glass sheet G is in the proper position below engaging surface 28, vacuum is drawn through the vacuum pickup 14 to lift the glass sheet G into engagement with surface 28. The accelerated rolls 24 and 26 resume their normal speed after the glass sheet is lifted by the pickup 14.

If desired, as the glass sheet G approaches the load position within transfer station 12, the rolls 26 decelerate in unison to a glass sheet speed on the order of 700 inches (17.8 m) per minute or less at the moment the glass sheet is lifted into engagement with the pickup 14. Decelerating the rate of rotation of the support rolls 26 to a speed less than the accelerated speed of transfer from the furnace 10 to the transfer station 12 before lifting the glass sheet G into engagement with shaping surface 28 of vacuum pickup 14 insures a smaller variation of glass sheet position from sheet to sheet when lifted off support rolls 26.

After vacuum is drawn along surface 28 of the pickup 14 to lift and secure the glass sheet G, the pickup 14 moves to position the glass sheet G at an unload position in one of the shaping stations. More particularly, the pickup 14 and the heat softened glass sheet G shuttle to the left as viewed in FIG. 2, i.e. to Position A, into shaping station 16A to position surface 28 and glass sheet G at an unload position between the lower and upper molds 36 and 38. When the glass sheet G is in the proper position in shaping station 16A, the vacuum along surface 28 is terminated to deposit the sheet onto the lower mold 36 and the pickup 14 immediately moves back toward its load position (Position C) with the transfer station 12. When pickup 14 is no longer between molds 36 and 38 at shaping station 16A, the molds move relative to each other to press the heat softened glass sheet G therebetween, as will be discussed later in more detail.

As the pickup 14 moves, the next heat softened glass sheet G is delivered to the transfer station 12. When the pickup is at position C and the glass sheet G is located below the pickup 14, vacuum is drawn along surface 28 and the glass sheet G is lifted into engagement therewith. The vacuum pickup 14 then shuttles to the right as viewed in FIG. 2, i.e. to Position B, to move surface 28 and glass sheet G from its load position in transfer station 12 to its unload position between the upper and lower molds at shaping station 16B. Vacuum is then terminated along surface 28 to deposit the heat softened glass sheet G on the lower mold at shaping station 16B and pickup 14 immediately shuttles to the left as viewed in FIG. 2 to reposition itself at Position C within transfer station 12 as the lower and upper molds in shaping station 16B move relative to each other to press the glass sheet therebetween. After the next glass sheet G enters transfer station 12 and is positioned below and lifted into engagement with surface 28, pickup 14 shuttles to the left to Position A to move the heat softened glass sheet G into shaping station 16A. The cycle is repeated to alternately transfer the glass sheet G to shaping stations 16A and 16B.

It should be appreciated that the movement of the vacuum pickup 14 and the delivery of the heat softened glass sheets from the furnace 10 to the transfer station 12 is synchronized such that the pickup 14 is in the load position within transfer station 12 prior to the glass sheet arriving at the desire position beneath surface 28.

After the glass sheet G has been deposited on the lower mold 36 and the sheet engaging surface 28 of pickup 14 has moved from its unload position within the shaping station 16A or 16B to its load position within the transfer station 12, the molds 36 and 38 move vertically relative to each other to press the glass sheet therebetween. During pressing, vacuum is drawn through the vacuum chamber of the upper mold 38 to hold the shaped glass sheet against the apertured lower wall 46 so that the glass sheet G remains in contact with wall 46 when the molds separate. After pressing, the molds move apart with vacuum still being drawn to hold the glass sheet G against the upper mold 38. The ring 56 then moves upstream from the cooling station 20A or 20B and is positioned beneath the upper vacuum mold 38. When the ring 56 is in position, the vacuum along the upper mold 38 is released, permitting the shaped glass sheet G to be deposited onto the ring 56.

The glass sheet G is transferred downstream to the cooling station 20A or 20B where it is cooled as required. More particularly, if the glass is to be used as a side window or back window, it will be cooled quickly to impart at least a partial member in the shaped glass sheet. If the shaped glass sheet is to be used in a windshield, the glass sheet is slowly cooled to anneal the glass. The glass sheet is then transferred to a cooling conveyor (not shown) for further cooling.

Although the molds 36 and 38 discussed above and illustrated in FIGS. 1 and 2 provide for full surface pressing, other glass sheet shaping arrangements known in the art may be used to shape the glass sheet. For example, the lower mold may be a slotted mold arrangement as disclosed in U.S. Pat. No. 4,272,274. In addition, the shaping surfaces of the molds in the shaping stations may be configured so as to shape the glass sheet G into a convex downward configuration, as shown in FIGS. 1 and 2, or in a convex upper configuration as shown in U.S. Pat. Nos. 4,746,348 and 5,004,491.

Figure 3:
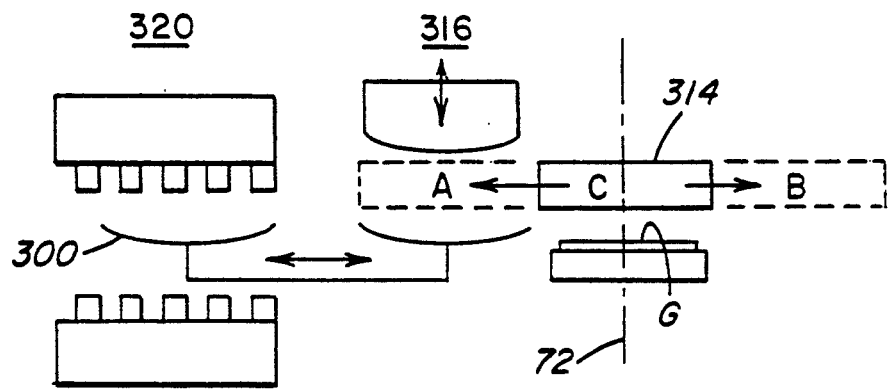
FIGS. 3–6 are views similar to FIG. 2 illustrating alternate embodiments of the invention.

FIG. 3 illustrates another sheet shaping arrangement incorporating the teachings of the present invention. The figure shows a shaping and cooling station to one side of the transfer station as viewed along the centerline 72 of the furnace 10 and it should be appreciated that a similar arrangement is provided at the other exit end of the transfer station. Specifically referring to FIG. 3, the molds are replaced with a movable shaping ring 300 which is positioned below vacuum pickup 314 when the pickup 314 and heat softened glass sheet G are at shaping station 316 in an unload position. The vacuum is terminated along the sheet engaging surface of the vacuum pickup 314 to drop the glass sheet G onto the ring 300 which contacts the glass sheet G slightly inboard of its periphery to shape the glass sheet G by gravity. This type of shaping arrangement is commonly referred to as drop forming and is disclosed in U.S. Pat. No. 4,233,049. If desired, an upper mold as shown in FIG. 3 may be positioned above the ring 300 so that when the pickup 314 leaves the shaping station 316, the upper mold presses the glass sheet G into the shaping ring 300 in a manner similar to that discuss earlier in connection with FIGS. 1 and 2. The ring 300 and the shaped glass sheet G then shuttle into a cooling station 320 to cool the glass.

It should also be appreciated that the molds in shaping stations 16A and 16B may have different glass sheet shaping configurations. For example, the surfaces of the molds in shaping station 16A may correspond to the shaped configuration for the inner glass sheet of a laminated windshield, while the shaping surfaces of the molds in shaping station 16B correspond to the configuration for the outer glass sheet as shown in FIG. 2A.

As shown in FIGS. 1 and 2, the glass sheets G travel in a generally straight path from the transfer station to the shaping station to the cooling station. If desired, the cooling stations may be oriented 90 relative to the shaping stations to form a "tuning fork" arrangement as is known in the art. This arrangement is particularly useful when fabricating inner and outer glass sheets for a laminated windshield since it keeps the glass sheets in close proximity to each other so that they may be mated after cooling to form a doublet pair that is further processed to form the windshield.

Although the previous discussion presented the pickup 14 as having flat glass sheet engaging surfaces, the engaging surfaces of the pickup 14 may be shaped so as to impart an initial configuration to the glass sheet. In addition, the pickup 14 may be constructed such that it engages each glass sheet G while in a flat configuration and subsequently deform it to impart an initial shape. This type of pickup arrangements may be used in combination with any of the glass sheet shaping arrangements previously discussed.

Figure 4:
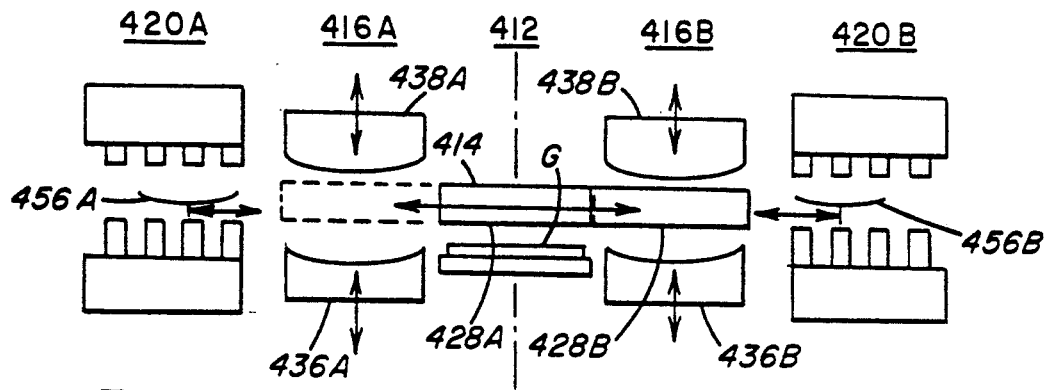

FIG. 4 illustrates another embodiment of the invention which incorporates a vacuum pick that has two glass sheet engaging surfaces. Transfer station 412 includes the vacuum pickup 414 with glass sheets engaging surfaces 428A and 428B. The pickup 414 is constructed so that vacuum may be independently drawn or released on each of the surfaces 428A and 428B. In the embodiment shown in FIG. 4, the vacuum pickup 414 is partitioned into two sections, each having an evacuation pipe (not shown) connected through a suitable valve arrangement (not shown) to a vacuum source (not shown). Drawing and releasing vacuum along each surface 428A and 428B of the vacuum pickup 414 is synchronized to a predetermined cycle, as will be discussed later in more detail.

As shown in FIG. 4, the vacuum pickup 414 is horizontally movable between shaping stations 416A and 416B via a shuttle arrangement (not shown) of a type well known in the art, in a manner similar to that discussed earlier with respect to vacuum pickup 14. More specifically, when the surface 428B of the pickup 414 is at an unload position at the glass sheet shaping station 416B, the surface 428A is at a glass sheet load position at the transfer station 412 as shown in FIG. 4. Similarly, when the surface 428A of the pickup 414 is at an unload position at shaping station 416A, the surface 428B is at a glass load position at the transfer station 412.

In operation, the vacuum pickup 414 is positioned in the transfer station 412 so that one of its engaging surfaces is at a load position within the transfer station 412 while its other engaging surface is at a unload position at one of the shaping stations. Referring to FIG. 4, pickup 414 is shown with engaging surface 428A at a load position within transfer station 412 while engaging surface 428B is between the upper and lower molds at shaping station 416B. When a heat softened glass sheet G is in the proper position within transfer station 412 below engaging surface 428A, the sheet is lifted into engagement with the surface 428A, e.g. using vacuum and/or air jets as discussed earlier, and held thereagainst. The pickup 414 then moves to position the glass sheet G at an unload position in one of the shaping stations. More particularly, the pickup 414 and the heat softened glass sheet G shuttle to the left, as viewed in FIG. 4, into shaping station 416A to position surface 428A and glass sheet G at an unload position between lower and upper molds 436A and 438A while surface 428B of the pickup 414 moves from an unload position within shaping station 416B to a load position within transfer station 412. When the glass sheet G is in the proper position in shaping station 416A, the vacuum along surface 428A is terminated to deposit the sheet onto the lower mold 436A.

As the pickup 414 moves from the transfer station 412 to shaping station 416A, the next glass sheet exits the furnace and moves towards transfer station 412 such that it arrives below surface 428B which is at its load position as the previous glass sheet is being deposited at a shaping station. Vacuum is drawn along surface 428B and the glass sheet G is lifted into engagement therewith.

The vacuum pickup 414 then shuttles to the right, as viewed in FIG. 4, to move surface 428B and glass sheet G from its load position in transfer station 412 to its unload position between the lower and upper molds 436B and 438B at shaping station 428B. When pickup 414 is no longer between molds 436A and 438A at shaping station 416A, the molds move relative to each other to press the heat softened glass sheet G therebetween. The shaped glass sheet is then transferred to cooling station 420A on transfer ring 456A and controllably cooled in a manner as discussed earlier. As the pickup 414 moves to the right, surface 428A moves from its unload position at shaping station 416A to its load position within transfer station 412 to receive the next heat softened glass sheet G. Vacuum is then terminated along surface 428B to deposit the heat softened glass sheet G on the lower mold at shaping station 416B as the next glass sheet G enters transfer station 412 and is positioned below and lifted into engagement with surface 428A of pickup 414. Pickup 414 then shuttles to the left to move the heat softened glass sheet G into shaping station 416A as pickup 414 leaves shaping station 416B, allowing the glass sheet G to be pressed between the upper and lower molds, transferred to cooling station 420B on transfer ring 456B and controllably cooled in a manner as discussed earlier. The cycle is repeated to alternately transfer the glass sheet G to shaping stations 416A and 416B.

It should be appreciated that the operation of the sheet shaping arrangement as discussed above with reference to FIG. 4 requires precise controls over the movement of the glass sheets into the transfer station 412 and the movement of the pickup 414. More specifically, since it is preferred that the pickup 414 leave the shaping station immediately upon depositing a heat softened glass sheet on a lower mold, the next glass sheet to be shaped must be at the glass sheet load position within the transfer station 412 under one of the sheet engaging surfaces 418A and 418B when the previous glass sheet is unloaded. If the next sheet arrives too soon, it may develop roll ripple while being supported in a stationery fashion on the rolls within the transfer station 412. If the sheet arrives too late, the pickup 414 will have to remain in a position between one of the pairs of shaping molds. This delay may adversely affect the shaping of the sheet between the molds.

Figure 5:
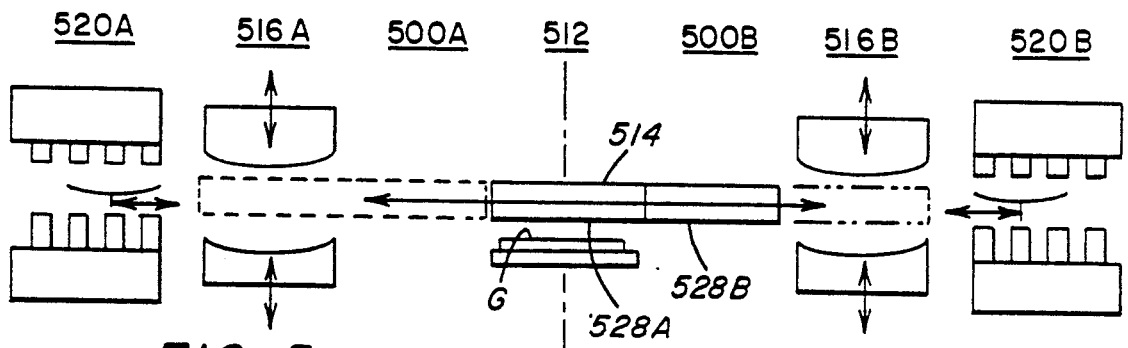
Figure 6:
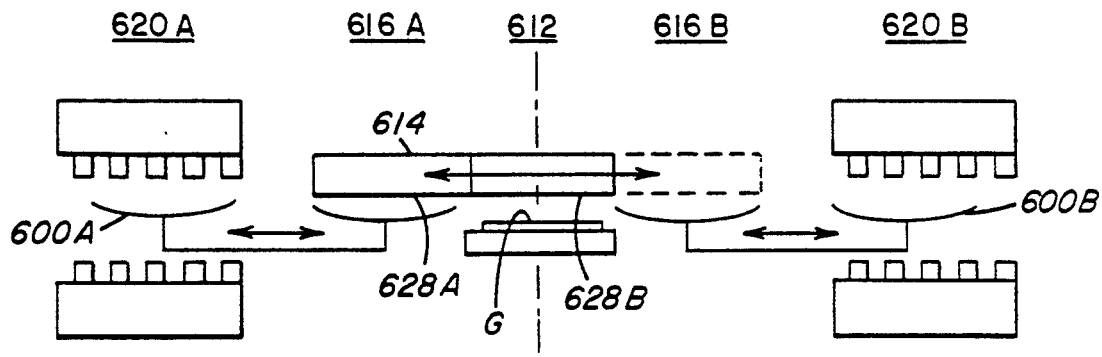

To avoid this potential control problem, FIGS. 5 and 6 provide alternate shaping arrangements. Specifically referring to FIG. 5, intermediate park stations 500A and 500B are provided between transfer station 512 and shaping stations 516A and 516B, respectively. This arrangement allows each of the sheet engaging surfaces 528A and 528B of the vacuum pickup 514 to be positioned at three different locations: a shaping station, park station, or transfer station. As a result, the vacuum pickup 514 may now deposit a glass sheet at a shaping station and immediately move to a park position to allow the shaping molds to shape the sheet even if the next glass sheet to be shaped is not yet at the load position within the transfer station 512. More specifically, when engaging surface 528A is at its load position within transfer station 512, engaging surface 528B is within park station 500B. When the pickup 514 moves to position surface 528A within shaping station 516A, surface 528B moves to parking station 500A. After a glass sheet is deposited from surface 528A for subsequent shaping, the pickup 514 shuttles to remove surface 528A from the shaping station 516A and position it within park station 500A. This movement also positions surface 528B within transfer station 512 at its load position to receive the next heat softened glass sheet. Similarly, when the pickup 514 moves to position surface 528B within shaping station 516B, surface 528A moves to parking station 500B. After a glass sheet is deposited from surface 528B for subsequent shaping, the pickup 514 shuttles to remove surface 528B from the shaping station 516B and position it within park station 500B. This movement also positions surface 528A within transfer station 512 at its load position to receive the next heat softened glass sheet.

FIG. 6 illustrates a shaping arrangement that combines the dual faced pickup with a shaping arrangement similar to that illustrated in FIG. 3. More, specifically, sheet engaging surfaces 628A and 628B of pickup 614 alternately deposit the glass sheets onto shuttling shaping rings 600A and 600B at shaping stations 616A and 616B, respectively, where the heat softened glass sheets sag by gravity to assume a desired shaped configuration. Rings 600A and 600B in turn transfer the glass sheet to corresponding cooling stations 620A and 620B. If desired, an upper mold (not shown) may be positioned between the glass unload position of the pickup 614 and a corresponding cooling station to assist in the sheet shaping operation. After receiving the glass sheet, the rings 600A or 600B move to a position below the corresponding upper mold which then moves downward to press the sheet into the ring. The ring may then proceed to the cooling station. As an alternative, the upper mold may be a vacuum mold and the sheet may be transferred via the upper vacuum mold to another ring (not shown) in a manner as discussed above with respect to FIGS. 1 and 2.

The forms of the invention shown and described in this specification represent illustrative preferred embodiments and it is understood that various changes may be made without the party from the spirit of the invention as defined in the following claimed subject matter.

We claim:

1. A method of shaping glass sheets, comprising:
   (a) heating a series of glass sheets;
   (b) positioning first and second shaping stations on opposing sides of a transfer station;
   (c) providing a vacuum pickup having first and second sheet engaging surfaces;
   (d) positioning said pickup such that said first sheet engaging surface is within said transfer station;
   (e) conveying a first sheet into said transfer station;
   (f) lifting said first sheet into engagement with said first sheet engaging surface of said vacuum pickup;
   (g) drawing a vacuum along said first sheet engaging surface to secure said first glass sheet thereagainst;
   (h) moving said pickup such that said first sheet engaging surface and said first glass sheet move from said transfer station to said first shaping station;
   (i) terminating said vacuum along said first sheet engaging surface to deposit said first glass sheet on a first shaping means at said first shaping station;
   (j) removing said first sheet engaging surface from said first shaping station;
   (k) shaping and controllably cooling said first sheet;
   (l) positioning said second sheet engaging surface within said transfer station;
   (m) conveying a second glass sheet into said transfer station;
   (n) lifting said second sheet into engagement with said second sheet engaging surface of said vacuum pickup;
   (o) drawing a vacuum along said second sheet engaging surface to secure said second glass sheet thereagainst;
   (p) moving said pickup such that said second sheet engaging surface and said second sheet move from said transfer station to said second shaping station;
   (q) terminating said vacuum along said second sheet engaging surface to deposit said second glass sheet on a second shaping means at said second shaping station;
   (r) removing said second sheet engaging surface from said second shaping station; and
   (s) shaping and controllably cooling said second sheet.

2. The method as in claim 1 wherein steps (l) through (s) are initiated prior to the completion of steps (d) through (k).

3. The method as in claim 2 wherein said positioning step (d), removing step (j) and moving step (p) locate said first sheet engaging surface within said transfer station and said second sheet engaging surface within said second shaping station and said moving step (h), positioning step (l) and removing step (r) locate said first sheet engaging surface within said first shaping station and said second sheet engaging surface within said transfer station, and further wherein step (m) and (n) occur during step (h) and steps (o) and (p) occur during step (i).

4. The method as in claim 2 further including the step of providing a first parking station between said first shaping station and said transfer station and a second parking station between said second shaping station and said transfer station and further wherein said positioning step (d) and removing step (r) locate said first sheet engaging position within said transfer station and said second sheet engaging surface within said second parking station, said moving step (h) locates said first sheet engaging position within said first shaping station and said second sheet engaging surface within said first parking station, said removing step (j) and positioning step (l) locate said first sheet engaging position within said first parking station and said second sheet engaging surface within said transfer station, said moving step (p) locates said first sheet engaging position within said second parking station and said second sheet engaging surface within said second shaping station.

5. The method as in claim 1 wherein said step (k) shapes said first glass sheet to a first configuration and said step (s) shapes said second glass sheet to a second configuration different from said first configuration.

6. The method as in claim 1 wherein said first shaping means includes a first lower shaping ring and said second shaping means includes a second lower shaping ring and further wherein said step (k) includes the step of moving said first shaping ring and said first glass sheet from said first shaping station to a first cooling station and said step (s) includes the step of moving said second shaping ring and said second glass sheet from said second shaping station to a second cooling station.

7. The method as in claim 6 wherein said first shaping station further includes an upper mold vertically aligned above said first lower ring when said lower ring is in said first shaping station and said second shaping station includes a second upper mold vertically aligned above said second lower ring when said lower ring is in said second station and further wherein said step (k) includes the step of moving said first upper mold and said first lower shaping ring relative to each other to press said first glass sheet therebetween and separating said first upper mold and said first lower shaping ring such that said shaped sheet is supported on said first lower shaping ring and said step (s) further includes the steps of moving said second upper mold and said second lower shaping ring relative to each other to press said second glass sheet therebetween and separating said second upper mold and said second lower shaping ring such said second shaped glass sheet is supported on said second shaped ring.

8. The method as in claim 1 wherein said first shaping station includes a first upper vacuum mold vertically aligned above a first lower shaping surface and said second shaping station includes a second upper vacuum mold vertically aligned above a second lower shaping surface and wherein said step (i) includes the step of terminating said vacuum along said sheet engaging surface of said pickup to deposit said first glass sheet on said first lower shaping mold at said first shaping station, said step (k) includes the steps of moving said first upper vacuum mold and said first lower shaping surface relative to each other to press said first glass sheet therebetween, drawing a vacuum along a sheet shaping surface of said first vacuum mold to secure said shaped glass sheet thereagainst, separating said first upper vacuum mold from said first lower shaping surface, positioning a first transfer ring beneath said first upper vacuum mold, terminating said vacuum along said first mold shaping surface to deposit said first sheet onto said first transfer ring, and moving said first ring and said first glass sheet to a first cooling station and further wherein said step (q) includes the step of terminating said vacuum along said sheet engaging surface to deposit said second glass sheet on said second lower shaping surface at said second shaping station and said step (s) includes the steps of moving said second upper vacuum mold and said second lower shaping surface relative to each other to press second glass sheet thereagainst, separating said second upper vacuum mold from said second lower shaping surface, positioning a second transfer ring beneath said second upper vacuum mold, terminating said vacuum along said second mold shaping surface to deposit said second sheet onto said second transfer ring and moving said second ring and said second glass sheet to a second shaping station.

9. A method of shaping glass sheets, comprising:
(a) heating a series of glass sheets;
(b) positioning first and second shaping stations on opposing sides of a transfer station;
(c) providing a vacuum pickup having first and second sheet engaging surfaces;
(d) positioning said pickup such that said first sheet engaging surface is within said transfer station and said second sheet engaging surface is within said second shaping station;
(e) conveying a first heat softened glass sheet into said transfer station;
(f) lifting said first sheet into engagement with said first sheet engaging surface of said vacuum pickup;
(g) drawing a vacuum along said first sheet engaging surface to secure said first glass sheet thereagainst;
(h) moving said pickup such that said first sheet engaging surface and said first glass sheet move from said transfer station to said first shaping station and said second sheet engaging surface moves from said second shaping station to within said transfer station while conveying a second heat softened glass sheet into said transfer station;
(i) terminating said vacuum along said first sheet engaging surface to deposit said first glass sheet on a first shaping means at said first shaping station while lifting said second sheet into engagement with said second sheet engaging surface of said vacuum pickup and drawing a vacuum along said second sheet engaging surface to secure said second glass sheet thereagainst;
(j) moving said pickup such that said second sheet engaging surface and said second sheet move from said transfer station to said second shaping station and said first sheet engaging surface moves from said first shaping station to said transfer station while conveying a next heat softened glass sheet into said transfer station;
(k) shaping and controllably cooling said first sheet;
(l) terminating said vacuum along said second sheet engaging surface to deposit said second glass sheet on a second shaping means at said second shaping station while lifting said next sheet into engagement with said first sheet engaging surface of said vacuum pickup and drawing a vacuum along said first sheet engaging surface to secure said next glass sheet thereagainst;
(m) moving said pickup such that said first sheet engaging surface and said next sheet move from said transfer station to said first shaping station and said second sheet engaging surface moves from second shaping station to said transfer station while conveying a next heat softened glass sheet into said transfer station;

(n) shaping and controllably cooling said second sheet.

(o) repeating steps (i) through (n).

10. The method as in claim 9 wherein said step (k) shapes said first glass sheet to a first configuration and said step (s) shapes said second glass sheet to a second configuration different from said first configuration.

11. An apparatus for shaping heat softened glass sheets, comprising:
- a transfer station to receive a heat softened glass sheet;
- a vacuum pickup having first and second downwardly facing sheet engaging surfaces to secure said heat softened glass sheets thereagainst by vacuum drawn along either of said engaging surfaces;
- first and second shaping stations positioned along opposing sides of said transfer station;
- first and second shaping means positioned within said first and second shaping stations, respectively;
- means to move said pickup between said shaping stations and within said transfer station such that when said first engaging surface of said pickup is within said transfer station, said second engaging surface is positioned within said second shaping station, and when said second engaging surface of said pickup is within said transfer station, said first engaging surface is positioned within said first shaping station;
- means to lift said heat softened glass sheet into engagement with one of said sheet engaging surfaces when said sheet engaging surface is within said transfer station;
- means to terminate vacuum drawn along said one sheet engaging surface to deposit said heat softened glass sheet from said one sheet engaging surface onto one of said shaping means within one of said shaping stations to shape said sheets;
- means to remove said glass sheet from said one shaping station; and
- means to controllably cool said sheet.

12. The apparatus as in claim 11 wherein said lifting and depositing means further include means to lift a first glass sheet into engagement with one of said sheet engaging surfaces while depositing a second glass sheet from the other of said sheet engaging surfaces.

13. The apparatus as in claim 11 wherein said cooling means includes a first cooling station positioned adjacent to said first shaping station and a second cooling station positioned adjacent to said second shaping station, said first and second shaping means include first and second lower shaping rings, respectively, and said removing means includes means to move said first ring from a first position within said first shaping station to a second position within said first cooling station and means to move said second ring from a first position within said second shaping station to a second position within said second cooling station.

14. The apparatus as in claim 13 wherein said first and second shaping means further include first and second upper molds with downwardly facing shaping surfaces vertically aligned above a corresponding first or second lower shaping ring.

15. The apparatus as in claim 11 wherein said first shaping means includes a first upper vacuum mold with a downwardly facing shaping surface vertically aligned above a first lower shaping surface and said second shaping means includes a second upper vacuum mold with a downwardly facing shaping surface vertically aligned above a second lower shaping surface, and further including means to move said first and second vacuum molds relative to said respective aligned first and second lower shaping surfaces to press a heat softened glass sheet therebetween and further wherein said cooling means include a first cooling station positioned adjacent to said first shaping station and a second cooling station positioned adjacent to said second shaping station and said removing means includes a first transfer ring movable from a first position beneath said first upper vacuum mold to a second position within said first cooling station, and a second transfer ring movable from a first position beneath said second upper vacuum mold to a second position within said second cooling station.

16. The apparatus as in claim 14 wherein said first shaping means includes sheet shaping surfaces having a configuration different from sheet shaping surfaces of said second shaping means.

17. An apparatus for shaping heat softened glass sheets, comprising:
- a transfer station to receive a heat softened glass sheet;
- a vacuum pickup having first and second downwardly facing sheet engaging surfaces to secure said heat softened glass sheets thereagainst by vacuum drawn along either of said engaging surfaces;
- first and second shaping stations positioned along opposing sides of said transfer station;
- first and second shaping means positioned within said first and second shaping stations, respectively;
- a first parking station between said first shaping station and said transfer station;
- a second parking station between said second shaping station and said transfer station;
- means to move said pickup between said shaping stations and within said transfer and parking stations such that when said first sheet engaging surface of said pickup is within said first shaping station, said first parking station, said transfer station, or said second parking station, said second sheet engaging surface of said pickup is within said first parking station, said transfer station, said second parking station, or said second shaping station, respectively;
- means to lift said heat softened glass sheet into engagement with one of said pickup sheet engaging surfaces when said one engaging surface is within said transfer station;
- means to terminate vacuum drawn along said one sheet engaging surface to deposit said heat softened glass sheet from said one sheet engaging surface onto one of said shaping means within one of said shaping stations to shape said sheet;
- means to remove said glass sheet from said one shaping station; and
- means to controllably cool said sheet.

18. The apparatus as in claim 17 wherein said cooling means includes a first cooling station positioned adjacent to said first shaping station and a second cooling station positioned adjacent to said second shaping station, said first and second shaping means include first and second lower shaping rings, respectively, and said removing means includes means to move said first ring from a first position within said first shaping station to a second position within said first cooling station and means to move said second ring from a first position within said second shaping station to a second position within said second cooling station.

19. The apparatus as in claim 17 wherein said first and second shaping means further include first and second upper molds with downwardly facing shaping surfaces vertically aligned above a corresponding first or second lower shaping ring.

20. The apparatus as in claim 17 wherein said first shaping means includes a first upper vacuum mold with a downwardly facing shaping surface vertically aligned above a first lower shaping surface and said second shaping means includes a second upper vacuum mold with a downwardly facing shaping surface vertically aligned above a second lower shaping surface, and further including means to move said first and second vacuum molds relative to said respective aligned first and second lower shaping surfaces to press a heat softened glass sheet therebetween and further wherein said cooling means include a first cooling station positioned adjacent to said first shaping station and a second cooling station positioned adjacent to said second shaping station and said removing means includes a first transfer ring movable from a first position beneath said first upper vacuum mold to a second position within said first cooling station, and a second transfer ring movable from a first position beneath said second upper vacuum mold to a second position within said second cooling station.

21. The apparatus as in claim 17 wherein said first shaping means includes sheet shaping surfaces having a configuration different from sheet shaping surfaces of said second shaping means.

* * * * *

UNITED STATES PATENT AND TRADEMARK OFFICE
CERTIFICATE OF CORRECTION

PATENT NO. : 5,320,661
DATED : June 14, 1994
INVENTOR(S) : Fecik et al.

It is certified that error appears in the above-identified patent and that said Letters Patent is hereby corrected as shown below:

Claim 16, column 14, line 16, please correct the claim dependency from "claim 14" to -- claim 11 --.

Signed and Sealed this

Twenty-second Day of October, 1996

Attest:

BRUCE LEHMAN

Attesting Officer

Commissioner of Patents and Trademarks